Jan. 5, 1971   R. C. WRIGHT, JR   3,552,210
TEMPERATURE INDICATING UTENSIL
Filed April 17, 1969
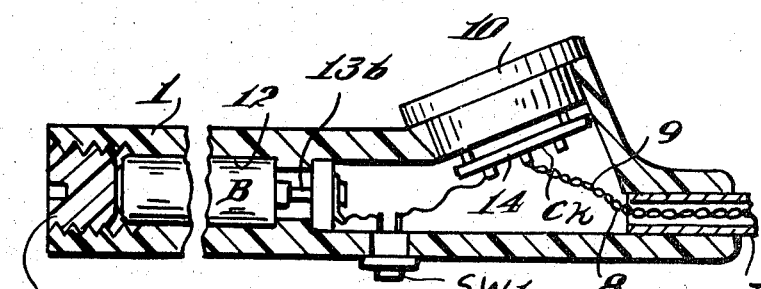
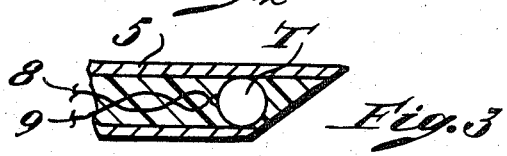
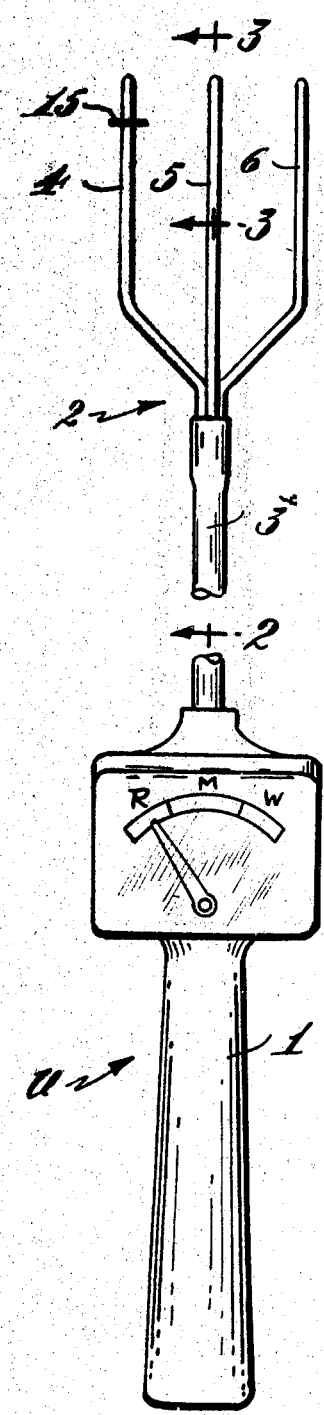
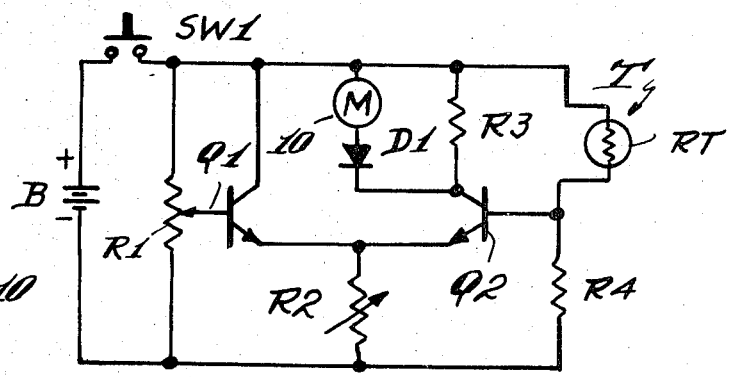
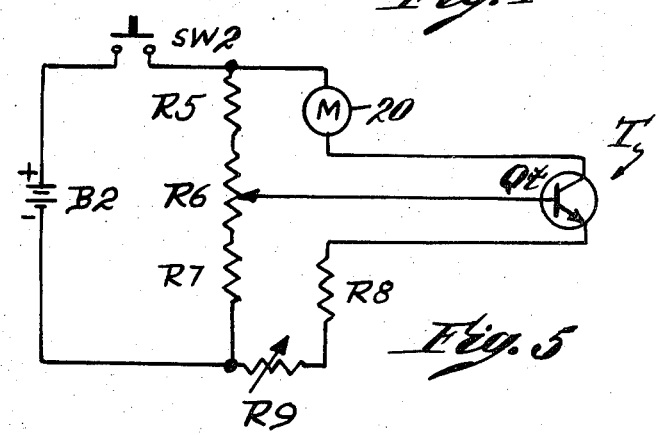
Inventor
Robert C. Wright, Jr.
By Roberts, Cushman & Grover
Att'ys @@@# United States Patent Office 3,552,210
Patented Jan. 5, 1971

3,552,210
TEMPERATURE INDICATING UTENSIL
Robert C. Wright, Jr., 18 Lafayette Ave.,
Hingham, Mass. 02043
Filed Apr. 17, 1969, Ser. No. 816,910
Int. Cl. G01k 1/14, 7/22
U.S. Cl. 73—352                                       9 Claims

ABSTRACT OF THE DISCLOSURE

A utensil, for example a fork, for measuring and indicating the internal temperature of food, comprises a handle with impaling means, for example fork tines, extending therefrom to be inserted into the food for manipulating it. The impaling means terminates in a tubular member having a sharp tip to facilitate penetration of the food. Mounted within the tubular means at the tip is a temperature sensitive element, e.g. a thermistor, which varies, e.g. by varying its resistance, according to temperature. An electrical energy source, for example a battery, is mounted within the handle, and a current meter is mounted on the handle. A circuit interconnects the temperature sensor, battery, and meter so that current flow through the meter varies with the temperature sensor and thereby indicates the temperature at the tip of the tubular member.

BACKGROUND OF THE INVENTION

(1) Field of the invention

The field of the present invention relates to a utensil for handling foods, especially cooked meats, and adapted to measure and indicate the temperature, and degree of cooking, of the food.

(2) Description of the prior art

A number of foods, especially broiled meats, are apt to be considered by different individuals to be "properly" cooked at different stages in the cooking process. Nearly every individual has a preference for steak, as an example, cooked to a stage that is usually described as rare, medium or well done. It is considered to be the mark of a skilled chef to be able to prepare a steak with just the desired degree of heat at the center. As a corollary, it is the mark of an unskilled chef to be wide of the mark, and to produce a result too rare or too charred to be palatable.

A convenient and accurate means of precise determination of the stage of cooking of food during the cooking process is, therefore, desirable. The availability of temperature indicators for measuring the internal temperature of roasts is well-known and these devices are in almost universal use. Most devices for this purpose, however, are not suited for use in measuring the temperature of such items as steaks, chops, hamburgers, or the like, because they (1) are slow to respond and thus cannot be used with broiled or fried foods which are cooked quickly over a high heat or (2) their size is too excessive in thickness or length for insertion in small portions of food, or (3) they are inconvenient to use during the cooking process because other demands on the cook must take priority.

SUMMARY OF THE INVENTION

Objects of the present invention are to provide a device for accurately and reliably determining food temperature which responds quickly, which has a compact temperature sensitive portion, and which requires a minimum of distraction from other duties of cooking.

According to the invention these objects are attained in a utensil, for example a fork, for measuring and indicating the temperature of food and comprising a handle for manual gripping, impaling means extending from the handle for insertion into the food for manipulation thereof; said impaling means terminating in a tubular member having a sharp tip to facilitate penetration of the food. A temperature sensitive element, for example a thermistor, is mounted in the tubular member at its end and conductive wires extend within the tubular means to the handle. Mounted on the handle is a current meter and within the handle is a source of electrical energy, e.g., a battery. Circuit means within the handle interconnect the temperature sensitive element, the current meter, and the battery, so that the current meter provides a reading related to the temperature of the sensor. In other aspects, the impaling means comprises adjustable stop means thereon to limit the depth of penetration of the thermistor, and the circuit includes a switch mounted on the handle for selective connection of said energy source to the meter. The circuit preferably includes calibrating means for selecting the range of temperatures to be indicated by the current meter scale, and for correlating the temperatures with the meter scale.

These and other features and novel aspects of the invention will be apparent from the following description of preferred embodiments.

DESCRIPTION OF THE DRAWING

FIG. 1 is a plan view, with portions broken away, illustrating a utensil according to the invention;
FIG. 2 is a section on line 2—2 of FIG. 1;
FIG. 3 is a section on line 3—3 of FIG. 1;
FIG. 4 is a schematic diagram of circuitry according to the invention; and
FIG. 5 is a schematic diagram of another embodiment of circuitry according to the invention.

DESCRIPTION OF THE PREFERRED EMBODIMENTS

The cooking utensil U illustrated in FIGS. 1–3 comprises a handle 1 shaped for convenient manual gripping by the user and constructed of a material of low heat conductivity, for example of Bakelite or another plastic. Extending from the handle 1 are impaling means 2 to be inserted into the food to enable it to be properly manipulated. As illustrated, this means comprises a tubular shank 3 secured at one end to the handle 1 and at the other end to three tubular metallic tines 4, 5 and 6 which terminates in sharp points to facilitate penetration of the food. One of the tines, for example the middle tine 5, has a temperature sensitive element T mounted therewithin near its tip (FIG. 3). The element T is secured there by non-toxic potting material 7, and has conductor wires 8 and 9 extending through the tubular tine 5 into hollow shank 3 and eventually to handle 1.

Mounted on handle 1 is a current meter 10 having an indicated needle 11 (FIG. 1) adapted to traverse a scale appropriately marked with R, M and W, signifying rare, medium, and well done. The housing 1 also contains, with a cavity 12 designed to receive it, an electrical energy source B which in the illustrated embodiment is a mercury battery. A threaded plug 13a secures battery B within cavity 12 and carries a battery terminal connector (not shown) of any standard type. Another connector 13b is mounted within handle 1.

The temperature sensitive element T, the current meter 10, and the battery B are interconnected by means of a circuit $C_k$ mounted on a circuit board 14 attached to the housing of meter 10. The circuit $C_k$, as will be more fully explained hereinafter, causes the meter needle 11 to move in accordance with temperature of the element T.

A circuit suitable to act as circuit $C_k$ of FIG. 3, using a thermistor RT as the temperature sensitive element T is illustrated in FIG. 4. The circuit is made operative by closing switch SW1 to connect energy source B into the circuit. The switch SW1 is preferably a push button switch spring biased in an open position and located on handle 1 in a place where it can be easily actuated with the same hand used to grip the handle (see FIG. 2). By keeping switch SW1 open until the circuit is needed, the life of energy source B is greatly extended.

The circuit of FIG. 4 includes transistors Q1 and Q2 operating as a differential amplifier and having a common emitter resistor R2. One input to the differential amplifier is at the base of transistor Q1. The base voltage is determined by the setting of adjustable resistor R1, which acts as a voltage divider for energy source B. The voltage at the second input to the differential amplifier, at the base of transistor Q2, is determined by thermistor $R_t$ and resistor R4 connected in parallel with energy source B and also functioning as a voltage divider. The output voltage of the differential amplifier, across collector resistor R3, is applied to current meter 10 through a series-connected diode D1 oriented to prevent a backward flow of current through the meter 10. By inspection of FIG. 4, it can be appreciated that the setting of resistor R1 determines what resistance value of the thermistor $R_t$ will result in zero current through meter 10. Likewise, the setting of adjustable resistor $R_2$ determines what range of resistance values of thermistor $R_t$ will produce a full scale deflection of meter needle 11. Since the resistance value of thermistor $R_t$ is directly associated with its temperature, these adjustments determine the initial temperature and range of temperatures which will be indicated by meter 10. In one typical example, these adjustments produced a 5% scale deflection at 130° F. and a 100% scale deflection at 200° F. Since the various circuit components may vary, these settings can be established with a standard temperature source to provide an accurate initial reading; once made, they need never be repeated.

Another circuit suitable to act as circuit $C_k$ of FIG. 3, using a miniature transistor $Q_t$ as the temperature sensitive element T is illustrated in FIG. 5. This circuit uses the gain of the transistor to amplify its own change in base-emitter voltage with changing temperature. A nearly linear collector current versus transistor temperature is achieved. The circuit is made operative by closing switch SW2 (preferably located on handle 1 in the same place as switch SW1 of FIG. 4) to connect a battery B2 into the circuit. Resistors R5 and R7 and potentiometer R6 are connected in series across battery B2 as a voltage divider to provide a variable voltage at the potentiometer tap. The potentiometer tap is connected to the base of transistor $Q_t$ to establish a fixed base-emitter bias and a corresponding temperature for which the meter 20, connected in series with the collector of transistor $Q_t$, will have zero deflection. Emitter resistors R8 and R9 (variable) are provided to control the range of emitter current which will correspond to a given temperature change, and thus control the range of temperatures which will produce a full scale deflection of meter 20. As with the adjustments of FIG. 4, the settings of resistors R6 and R9 can be initially established using a standard temperature source and need not be changed.

In operation the utensil U is manipulated just like an ordinary barbecue fork for supplying meat to the grille, turning it, and removing it. When it is desired to determine if the meat is done to the desired degree, the fork is inserted into the meat until temperature sensitive element T at the tip of one tine is approximately mid-way through the meat. Switch SW1 or SW2 is closed, and within a very short time, roughly within three seconds in the illustrated embodiments, the meter responds and the needle indicates how well done that piece of meat is. If done to the proper degree, the meat is removed. To facilitate insertion of the temperature sensitive element to the proper depth, and adjustable stop 15 (FIG. 1) may be attached to one of the tines. The stop 15 may comprise, for example, a metal plate frictionally secured to the tine.

The circuits illustrated in FIGS. 4 and 5 clearly indicate the connection of the components, which have their values, types, or ratings more fully disclosed in the following list which refers to the numerals of the drawings.

| | |
|---|---|
| B | 2.7 volts mercury battery. |
| B2 | 1.35 volts mercury battery. |
| R1 | 3K ohms potentiometer. |
| R2 | 5K ohms potentiometer. |
| R3 | 330 ohms. |
| R4 | 47K ohms. |
| R5 | 10K ohms. |
| R6 | 2K ohms potentiometer. |
| R7 | 2K ohms. |
| R8 | 100 ohms. |
| R9 | 100 ohms (variable) |
| $R_t$ | Thermistor, miniature bead-type, 100K ohms at 70° F. |
| Q1, Q2 | Texas Instruments Type "2N3702." |
| Qt | G.E. type "D26E-6." |
| D1 | Type "1N482." |

Meters 10 and 20—Micronta, 1 milliampere scale, specially calibrated in temperature, 120° F. to 200° F., and/or in color.

It should be understood that the foregoing disclosure is for the purpose of illustration, and that the invention includes all modifications within the scope of the appended claims.

I claim:

1. A utensil for measuring and indicating the temperature of food, comprising
   a handle for manual gripping;
   impaling means in the form of a fork extending from the handle for insertion into the food for manipulation thereof; said impaling means terminating in a tubular member having a sharp tip to facilitate penetration of the food; said tubular member being one tine of said fork;
   temperature sensitive means mounted in said tubular member at said tip;
   conductive means extending within said tubular means from said temperature sensitive means to said handle;
   a source of electrical energy mounted within said handle;
   a current meter mounted on said handle; and
   circuit means within said handle interconnecting said temperature sensitive means through said conductive means with said energy source and with said current meter, so that current flow through said current meter varies with said temperature sensitive means and said current meter thereby indicates the temperature at said tip.

2. A utensil according to claim 1 further comprising stop means on said impaling means to limit depth of penetration.

3. A utensil according to claim 1 wherein said impaling means are hollow through their entire length and said conductive means extend therethrough to said handle.

4. A utensil according to claim 1 wherein said circuit means comprises a switch mounted on said handle and adapted to connect said energy source to said current meter and temperature sensitive means.

5. A utensil according to claim 4 wherein said switch is biased in open position by spring means.

6. A utensil according to claim 1 wherein said circuit means comprise means for adjusting the range temperatures indicated by the scale of said current meter.

7. A utensil according to claim 1 wherein said circuit means comprises means for correlating the current flow through said temperature sensitive means with said current meter scale to select the corresponding temperature value at which no needle deflection occurs.

8. A utensil according to claim 1 wherein said temperature sensitor means comprises a thermistor and said circuit means comprises a differential amplifier having a first voltage divider at one input and a second voltage divider including said themistor means at the other input, said voltage dividers being connected in parallel with said energy source, and said current meter at the output of said differential amplifier.

9. A utensil according to claim 1 wherein said temperature sensitive means comprises a transistor, said current meter is in series with said transistor collector and said energy source, and wherein said circuit means comprises a voltage divider in parallel with said energy source for applying a portion of its voltage as base-emitter bias, and emitter resistance means connected between the voltage divider and emitter of the transistor, whereby said transistor amplifies its base to emitter voltage change as a function of temperature and applies said amplified signal to said current meter through said transistor collector.

References Cited

UNITED STATES PATENTS

| | | | |
|---|---|---|---|
| 2,787,948 | 4/1957 | Mathis | 73—352X |
| 2,816,997 | 12/1957 | Conrad | 73—352UX |
| 2,898,845 | 8/1959 | Dight | 73—352X |
| 2,967,428 | 1/1961 | Burgert | 73—352 |
| 3,106,645 | 10/1963 | Kaufman | 73—362X |
| 3,219,843 | 11/1965 | Follett | 73—362UX |
| 3,295,353 | 1/1967 | Hagen | 73—362 |

LOUIS R. PRINCE, Primary Examiner

D. E. CORR, Assistant Examiner

U.S. Cl. X.R.

73—362